US006253239B1

(12) United States Patent
Shklar et al.

(10) Patent No.: US 6,253,239 B1
(45) Date of Patent: *Jun. 26, 2001

(54) SYSTEM FOR INDEXING AND DISPLAY REQUESTED DATA HAVING HETEROGENEOUS CONTENT AND REPRESENTATION

(75) Inventors: Leon Shklar, East Brunswick; David Makower, Irvington, both of NY (US)

(73) Assignee: Information Architects Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/436,564

(22) Filed: Nov. 9, 1999

Related U.S. Application Data

(63) Continuation-in-part of application No. 08/936,111, filed on Sep. 23, 1997, now Pat. No. 5,983,267.

(51) Int. Cl.[7] .................... G06F 15/16; G06F 15/173; G06F 7/00
(52) U.S. Cl. ..................... 709/217; 709/238; 707/10
(58) Field of Search ................... 709/217, 219, 709/220, 229, 238; 707/10

(56) References Cited

U.S. PATENT DOCUMENTS 5,732,270  3/1998  Foody et al. .
5,752,245  5/1998  Parrish et al. .
5,790,793  8/1998  Higley .
5,793,980  8/1998  Glaser et al. .
5,799,310  8/1998  Anderson et al. .
5,826,025  10/1998  Gramlich .
5,832,512  11/1998  Mastors et al. .
5,983,267  * 11/1999  Shklar et al. ................... 709/217

OTHER PUBLICATIONS

L. Shklar, S. Thatte, H. Marcus and A. Sheth; The "The InfoHarness" Information Integration Platform; Proceedings of the Second International World Wide Web Conference '94, Chicago, IL, Oct., 1994.

(List continued on next page.)

Primary Examiner—Zarni Maung
(74) Attorney, Agent, or Firm—Adams, Schwartz & Evans, P.A.

(57) ABSTRACT

A system and method provides flexible access to heterogeneous information from numerous sources. This is accomplished without relocating the original data, by analyzing the data in its existing format and assorted locations, in order to discern the logical structure of the data, in terms of whatever units might be applicable for the specific type of data in question (e.g., paragraphs, sections, articles, chapters, frames, etc.). The result is an object-oriented model of that data structure. The system also allows for customization of the format for displaying the information, once the model has been constructed. The data thus remains in its original location and format, but is presented through the system in a coherent, uniform format.

10 Claims, 16 Drawing Sheets

OTHER PUBLICATIONS

L. Shklar, K. Shah and C. Basu; Putting Legacy Data on the Web: A Repository Definition Language; Special Issue of "ISDN and Computer Networks"; Proceedings of the Third International World Wide Web Conference '95, vol. 27, No. 6, Apr. 1995.

L. Shklar, A. Sheth, V. Kashyap and K. Shah; InfoHarness: Use of Automatically Generated Metadata for Search and Retrieval of Heterogeneous Information; Proceeding of CAiSE'95, Jun. 12–16, Jyvaskyla, Finland. LNCS #932, Springer–Verlag, 1995.

L. Shklar, K. Shah, C. Basu and V. Kashyap; Modeling Heterogeneous Information; Proceedings of the Second International Workshop on Next Generation Information Technologies(NGITS'95); Jun. 27–30; 1995; Naharia, Israel.

M. Minas and L. Shklar; Visual Definition of Virtual Documents for the World–Wide Web; Proceedings fo the Third International Workshop on Principles of Document Processing; Palo Alto, CA; 1996.

L. Shklar, D. Makower and W. Lee; MetaMagic: Generating Virtual Web Sites Through Data Modeling; Poster Proceedings of the Sixth International World Wide Web Conference '97;Santa Clara, CA; Apr. 7–11, 1997.

S. Macscassy and L. Shklar; Maintaining Information Resources; Proceedings of the Third International Workshop on Next Generation Information Technologies (NGITS'97), Jun. 30–Jul. 3, 1997; Neve Ilan, Israel.

L. Shklar; Web Access to Legacy Data; Tutorial Notes, The Fifth International World Wide Web Conference '96, Paris France; pp. 241–256; O'Reilly & Assoc.; May 1996.

L. Shklar, C. Behrens and C. Basu, E.Au.; New Approaches to Cataloguing, Querying and Browsing Geospatial Metadata; Proceedings of the Second IEEE Metadata Conference; Sep. 16–17, 1997; Silver Spring, Maryland.

L. Shklar, D. Makower, E. Maloney and S. Gurevich; An Application Development Framework for the Virtual Web; Proceedings of the Fourth International Conference on Information Systems, Analysis and Synthesis, Jul. 12–16, 1998, Orlando, Florida.

L. Shklar and H. Hirsh; Imposing Bounds of the Number of Categories for Incremental Concept Formation; Computational Learning Theory and Natural Learning Systems; vol. IV; M.I.T. Press, 1997..

M. Minas, L. Shklar; Visualizing Information Repositories on the World–Wide Web; Presented at ISI; Oct., 1996; pp. 1–12; Berlin, Germany.

L. Shklar and L.T. McCarty; LexHarness: Providing Flexible Access to Legal Information on the World–Wide Web; Computer Science Department, Rutgers University, New Brunswick, NJ 08902; Presented at American–French Conference on AI & Law; Apr., 1996; Ithaka, New York.

L. Shklar; Web Access to Heterogeneous Information: Methods and Applications; A Dissertation submitted to the Graduated School–New Brunswick, Rutgers, the States University of New Jersey; Oct. , 1996; New Brunswick, New Jersey.

World–Wide–Web Proxies; Luotonent et al.; pp. 1–8; Apr., 1994.

* cited by examiner

```
<HTML>
<HEAD>
<TITLE>rfcListFrame</TITLE>
<BASE TARGET="rfcRightFrame">
</HEAD>

<BODY BGCOLOR="#66CCFF" LINK="#FF0000" VLINK="#FF0000">

<P>
<H3 ALIGN="CENTER">
<!--#MM BACKLINK
        TARGET="rfcRightFrame"
        RESOURCE="_self"
        PARAMS="template=rfcRightFrameTemplate.html
            &content=concat,listAll"-->
<!--#MM ATTRIBUTE NAME="label"-->
<!--#MM /BACKLINK -->
</H3>
<HR>
<FONT SIZE="2">
<!--#MM PRESENT
        RESOURCE="_self"
        TYPE="INLINE"
        PARAMS="template=rfcRightFrameTemplate.html
            &content=skip,list(concat,listAll)" -->
</FONT>
</BODY>
</HTML>
```

Fig. 3c

```
DEFINE MATCH Empty_Line ^\s*$;
DEFINE MATCH Separator ^\*\*\*\*\*+$;
DEFINE MATCH Title ^([^\n]+\n)+ AND NOT $Separator;
DEFINE MATCH Item_Body UNTIL $Separator;
DEFINE MATCH News_Item
    ($Empty_Line)* ($Title) ($Empty_Line)+ $Item_Body;
DEFINE ETYPE News FROM ASCII_Encap
    BODY SELECT $News_Item sequence() $2;
```

Fig. 4

```
BEGIN;
    TYPE INDEX   WAIS;
    TYPE         News;
    VAR IHO      Index;
    VAR SET IHO  Item_Set;

Item_SET = ENCAP News "/u/leon/news";
    Index = INDEX WAIS Item_Set "/u/leon/db/News";
    WRITE Index, Item_Set;
END;
```

Fig. 5

```
begin;
    objectID = "808061e8:ftp://latte/News/tech_072996%1";
    objectType = "TXT:news";
    location = "ftp://latte/News/tech_072996%1";
    name = "Close encounters with our favorite marsians";
end;
begin;
    objectID = "808061e8:ftp://latte/News/tech_072996%2";
    objectType = "TXT:news";
    location = "ftp://latte/News/tech_072996%2";
    name = "PArty time at Smithonian";
end;
begin;
    objectID = "808061e8:ftp://latte/News/world_072996%1";
    objectType = "TXT:news";
    location = "ftp://latte/News/world_072996%1";
    name = "Israel is safe to visit";
end;

link;
    parent = "808061e8:/home/leon/mm/db/News:wais";
    child = "808061e8:ftp://latte/News/money_072996%1";
end;
link;
    parent = "808061e8:/home/leon/mm/db/News:wais";
    child = "808061e8:ftp://latte/News/money_072996%2";
end;
link;
    parent = "808061e8:/home/leon/mm/db/News:wais";
    child = "808061e8:ftp://latte/News/money_072996%3";
end;
```

Fig. 6

SYSTEM FOR INDEXING AND DISPLAY REQUESTED DATA HAVING HETEROGENEOUS CONTENT AND REPRESENTATION

This application is a continuation-in-part of patent application Ser. No. 08/936,111 filed on Sep. 23, 1997, now U.S. Pat. No. 5,983,267.

FIELD OF THE INVENTION

The instant invention relates generally to a computerized system and method for providing flexible access to heterogeneous information from numerous sources. More specifically, the invention relates to a system for accessing and presenting data by creating an object oriented organization of the data that can be used to customize the format for displaying the information in real time.

BACKGROUND OF THE INVENTION

The explosion in recent years of the availability and use of the worldwide Internet has made available an almost limitless amount of information. For corporations, this has meant that their internal computer networks, formerly difficult to expand and maintain, have become merely private corners of the vast Internet, making tremendous data available at every desktop. The World Wide Web and intranets continue to grow, and while it has become easier to make information available through such services, it is often impossible to obtain access to exactly the right information in a desired form. For example, the recent proliferation of the use of browsers has created an instantaneous demand for information formatted in either HTML or other browser-readable formats. As is known, documents stored in HTML include embedded within the data formatting codes that tell the ultimate browser how to display the information. For example, headers may be shown in bold, while chapter titles are displayed as hyperlinks to display other sections of the document or other documents. As a result of the demand for such document coding, organizations and individuals have devoted substantial effort and expense to the task of copying and reformatting data that already exists on the Internet into HTML-coded information as a necessary step for making such information available via web browsers.

With corporations devoting millions of man-hours to duplicate and adapt corporate data into forms more suitable for presentation on a Web-based Internet or Intranet or other network, multiplied data-maintenance costs and the proliferation of obsolete data are new problems created. Specially coded/formatted data can quickly become obsolete when browser languages change or are improved by advances.

One possible, but unworkable, solution, is to simply display the documents in whatever format they are stored. Straight text is shown as straight text, for example. However, this display strategy loses the increased functionality and improved readability given by enhanced and/or customized formatting and hyperlinks. Further, displaying more complex formatted data, such as word-processing and page-layout formats, would, in practicality, require running the programs that created them to achieved the look and layout particular to that program, or at the very least customized translators must be created to emulate those programs, an often impossibly complicated and cumbersome solution. Even when it can be done, there are often problems of version control, unavailability of translating tools and inconsistent presentations.

SUMMARY OF THE INVENTION

In view of the deficiencies of the prior art, it is an object of the present invention to provide a system that will display stored data in an enhanced and/or customized format, regardless of the formatting of the stored data.

It is a further example of the present system to provide a programming environment that allows for creation of objects to analyze and format stored data.

It is another object of the present invention to provide a system that analyzes and pre-indexes stored data, without altering the data, to accomplish real-time generation of an enhanced and/or customized format presentation of the stored data for display.

It is a still further object of the invention to provide a system for formatting and displaying information that uses a graphical interface and language for controlling the indexing and display of stored data.

The present invention is a system and method for providing flexible access to heterogeneous information from numerous sources. This is accomplished without relocating the original data, by analyzing the data in its existing format and assorted locations, in order to discern the logical structure of the data, in terms of whatever units might be applicable for the specific type of data in question (e.g., paragraphs, sections, articles, chapters, frames, etc.). The result is an object-oriented model of that data structure. The system also allows for customization of the format for displaying the information, once the model has been constructed. The data thus remains in its original location and format, but is presented through the system in a coherent, uniform format.

The resulting object-oriented model, a repository, contains objects, or resources, each in turn containing metadata that points to and describes a unit of the original data. The repository and the resources that comprise it are generated by a program, which itself is automatically created by the system from structure and type specifications previously defined. The type specifications define both the size and format of the subunits of the stored data. The structure specifications define how the subunits are to be grouped together for search, traversal, and presentation purposes. The smallest subunit (e.g., a single line of text, a paragraph, or a section) defined at this stage represents the smallest unit of information that can later be presented separately from other such units. The invention is also comprised of a visual language for inputting the structure specifications and automatically generating the metadata repositories. The system of the present invention also includes various agents for monitoring and maintaining the stored data to ensure that changes to stored data are notified and handled appropriately.

In more detail, the invention provides a system for displaying data from a source location at a display location via electronic networking, comprising: data desired to be displayed at the display location, the data having a predetermined format and accessible via a server at the source location of the data; a type specification particular to the data, the type specification defining both a format of the data and one or more instructions for extracting encapsulation units for the data, each of the encapsulation units defining a portion of the data for displaying at the display location; metadata identifying how to access the data and how to present the data at the display location, the metadata residing at one or more intermediate locations adapted to be in communication with both the source and the display locations; template data for determining formatting of the data or an encapsulated unit thereof to be displayed at the display location; and means for processing the metadata to access and to retrieve the data or an encapsulated portion thereof, and for displaying the data or an encapsulated portion thereof at the display location.

In another embodiment, this invention provides A method for providing data for display at a display location remote from a source location at which the data is stored, the data being provided to the display location via electronic networking, the method comprising: providing data desired to be displayed at the display location in a predetermined format, the data accessible from the source location via a server at the source of the data; specifying, particular to the data, a type specification defining both a format for the data and one or more instructions for extracting one or more encapsulation units of the data to be displayed at the display location; generating metadata, the metadata residing on an intermediate server between the server at the source data location and the display location, the intermediate server adapted to be in communication with the display location, the metadata identifying how to access the data from the server at the data source and how to format the data for presentation at the display location; providing template data for determining the formatting of the data or an encapsulated portion thereof displayed at the display location; and processing means responsive to a user at the remote location issuing a command to display the data or an encapsulated portion thereof at the remote location, the processing including the step of generating the metadata and presenting the data or an encapsulated portion thereof for display at the display location.

In various other embodiments, the data can be defined by different type specifications, and multiple templates can be used for displaying the information differently (at the same display location, or differently at separate display locations). In its broadest sense, "data" should be understood to include text and mark-up language files, images (e.g., a still, or a video feed), executable code (whether compilable or interpretable), sound/audio feed, and modelling language files (e.g., VRML).

BRIEF DESCRIPTION OF THE DRAWINGS

The foregoing and other objects and advantages of the present invention will become apparent to those skilled in the art upon reading the following detailed description of the preferred embodiment, in conjunction with a review of the appended drawings, in which:

FIG. 3c is a portion of a presentation specification of the present invention;

FIG. 4 is a portion of a type specification of the present invention;

FIG. 5 is a portion of a structure specification according to the present invention;

FIG. 6 is a portion of metadata generated by the system of the present invention;

DETAILED DESCRIPTION OF THE PREFERRED EMBODIMENTS

Figure 1:
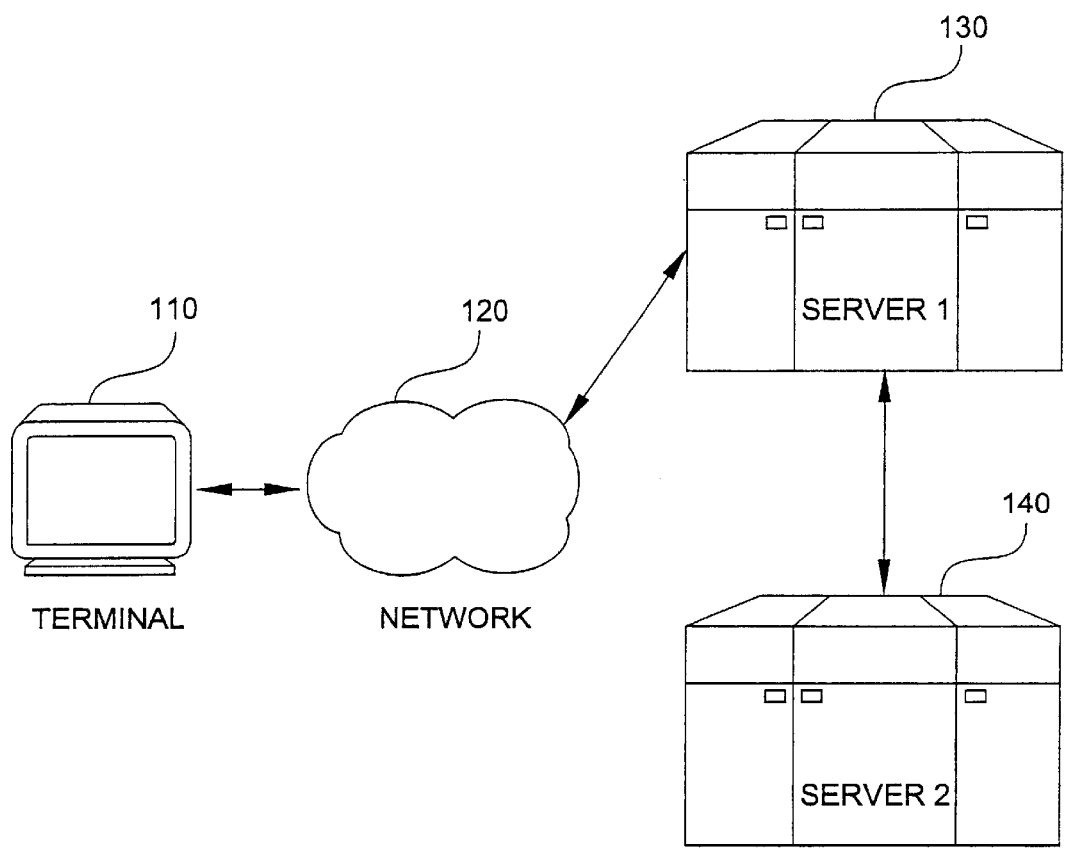
FIG. 1 is an overall schematic view of the system of the present invention.

Referring now to FIG. 1, the system of the present invention is shown in the broadest overall schematic form. In operation, a user accessing the system from terminal 110 will be using a program that converts incoming data to information displayed on a screen (i.e., CRT, LCD, or other type display device); preferably that program is a browser that is capable of displaying information received with standard formatting codes, such as Hypertext Markup Language, or "HTML", although any standard format may be adapted similarly.

Requests for data to be displayed are sent by the user from the terminal 110 through any network 120, such as the global Internet or a company's intranet, and received via the network's routing scheme at a system server 130. Located on the system server 130 are many of the components of the system described below, including the metadata which relates to stored data on remote servers, such as remote server 140. It is possible that stored data could also be located on a different portion of the system server 130, or on multiple remote servers. There may also be multiple system servers, each having metadata and each being separately accessible. One or more of these system servers are intermediate servers because they lie in the path of communication between the display terminal and the server containing the data to be displayed.

In basic operation, the user's request is received by the system at the system server 130. The system will then retrieve the metadata for the requested stored data. Using the metadata as an index and formatting guide, the system reads subunits of stored data specified by the metadata and creates a data stream (e.g., in HTML or other requested format) for return to the terminal 110, at which the data is ultimately displayed. For the remainder of this description, HTML will be used as the example browser formatting language and HTTP as the communications protocol, although it is to be understood that any existing or developed language and protocol will work similarly.

Figure 2:
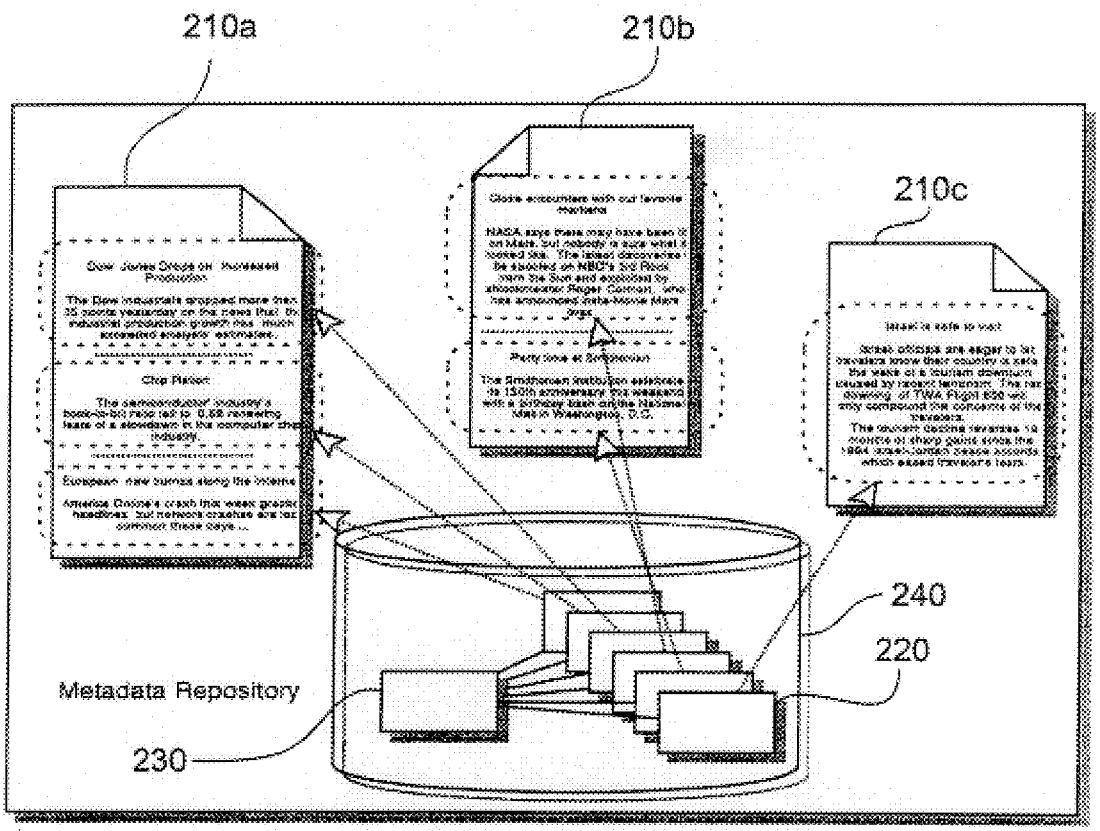
FIG. 2 is a schematic view of stored data and its associated metadata.

Referring now to FIG. 2, the relationship between stored data and its associated metadata is shown by example. The three "documents" of stored data, represented at 210a, 210b and 210c each contain discrete news items—three items, two items and one item, respectively. Thus, a "document" can be a single piece of information or a set of pieces of information. Each news item in one of these documents in FIG. 2 is separated from adjacent items by a line of asterisks. An appropriate repository defines each news item as a separate metadata object 220. As determined by the user in a type specification described below, the system detects a blank line followed by a line of asterisks, and thus defines the separation of "adjacent" news items in a document. (For ease of explanation, the documents are shown in FIG. 2 as scrolls of paper so that separate subdocuments are physically adjacent to each other, but it is understood by those in computer sciences that these abstractions are an analogy for a database and its parts.) Based on a pre-compiled type specification, the system's encapsulation process causes each news item to be associated with an encapsulation unit. The type specification is defined to separate out the title of the news item so that it is stored as an attribute and later utilized by a presentation specification; for example, the title may be defined as the first portion after the asterisks, then a blank line, and then the body of the news item. As a display attribute in the type specification, the title can be offset in bold upon display.

The individual item metadata units 220 are then grouped according to their association in a virtual container 230 and stored together on the main server as a repository 240. As a repository, the stored metadata contains all the necessary information to retrieve and display the stored data news items 210 in any desired format. For example, all news items from a single day can be associated as a separate container 230 in the repository 240.

Stored data, such as the news items 210, need not be stored static data. For example, the remote "stored" data could be financial information that is constantly changing. In such a case, the stored data is a link, such as a Universal Resource Locator or "URL", to another remote server that will return the requested data (current stock price, volume, market data, etc.). Because the type specification is defined to expect a certain format, identical to static stored data, the returned data should always be in that same format. The substantive "data" can be of any type that is transmissible over the network (or can be converted to transmissible data), including various types of computer data (e.g., markup language files, executable code, ASCII text, image files, financial data, etc.), audio and/or video, and the like, and so can be stored or real-time (or delayed).

It is also possible for an encapsulated unit to refer to another object of metadata, such as a repository, which in turn refers to other metadata objects or stored data. The system is therefore indexed recursively. The result is that the term "stored data" is referring to any data source, such as static data, dynamic data (such as the retrieved financial information), another metadata reference, index, etc. Repositories may also refer to repositories as resources, in addition to data resources.

Just as the system, when configured, can detect simple asterisks in a plain text file during encapsulation, it can also configured to detect complex organization codes (chapter, paragraph, page, etc.). If need be, for highly complex stored data, such as FRAME-MAKER files, the system includes pre-processors for the stored data for easier encapsulation (i.e., metadata-based indexing). The pre-processing may also have to be repeated upon presentation of the data.

For each type of stored data (text, Word files, WordPerfect files, etc.), the user must create a type specification, which is essentially a listing that defines the correspondence between any formatting codes or format (e.g., blank lines) in the stored data, encapsulation units, and metadata attributes. The creation and use of the type specifications is described more fully below.

The stored data must be encapsulated through content-descriptive and access-descriptive metadata before the system can ultimately retrieve the stored data and create an HTML formatted return data stream. It is contemplated that the encapsulation may occur at the time of the request, immediately followed by retrieval, but for efficiency and response time concerns, it is preferred that the encapsulation take place at a time before the request. The metadata is then stored until a request is received.

Figure 3A:
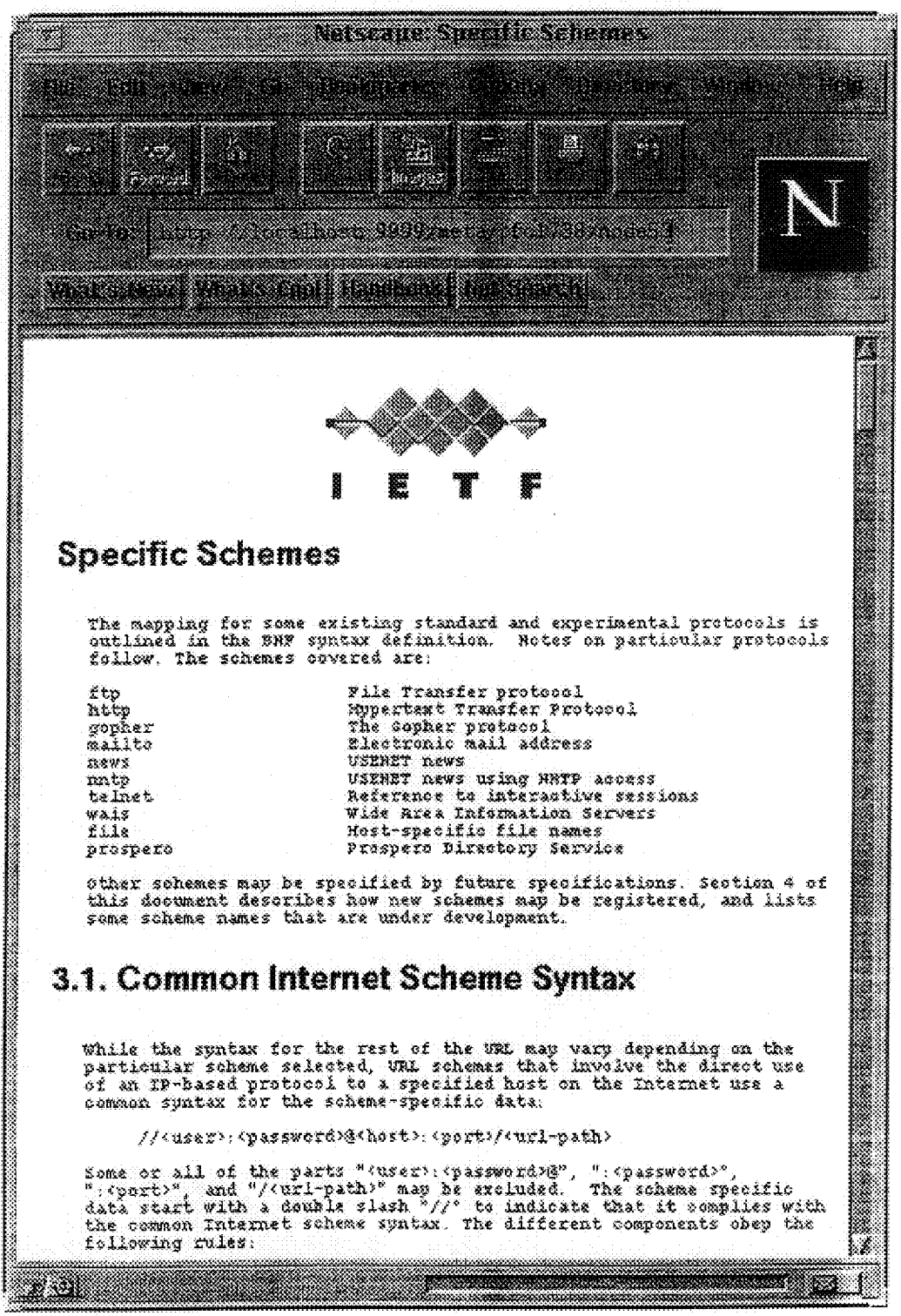
FIGS. 3a–3b are examples of browser output generated by the present system.
Figure 3B:
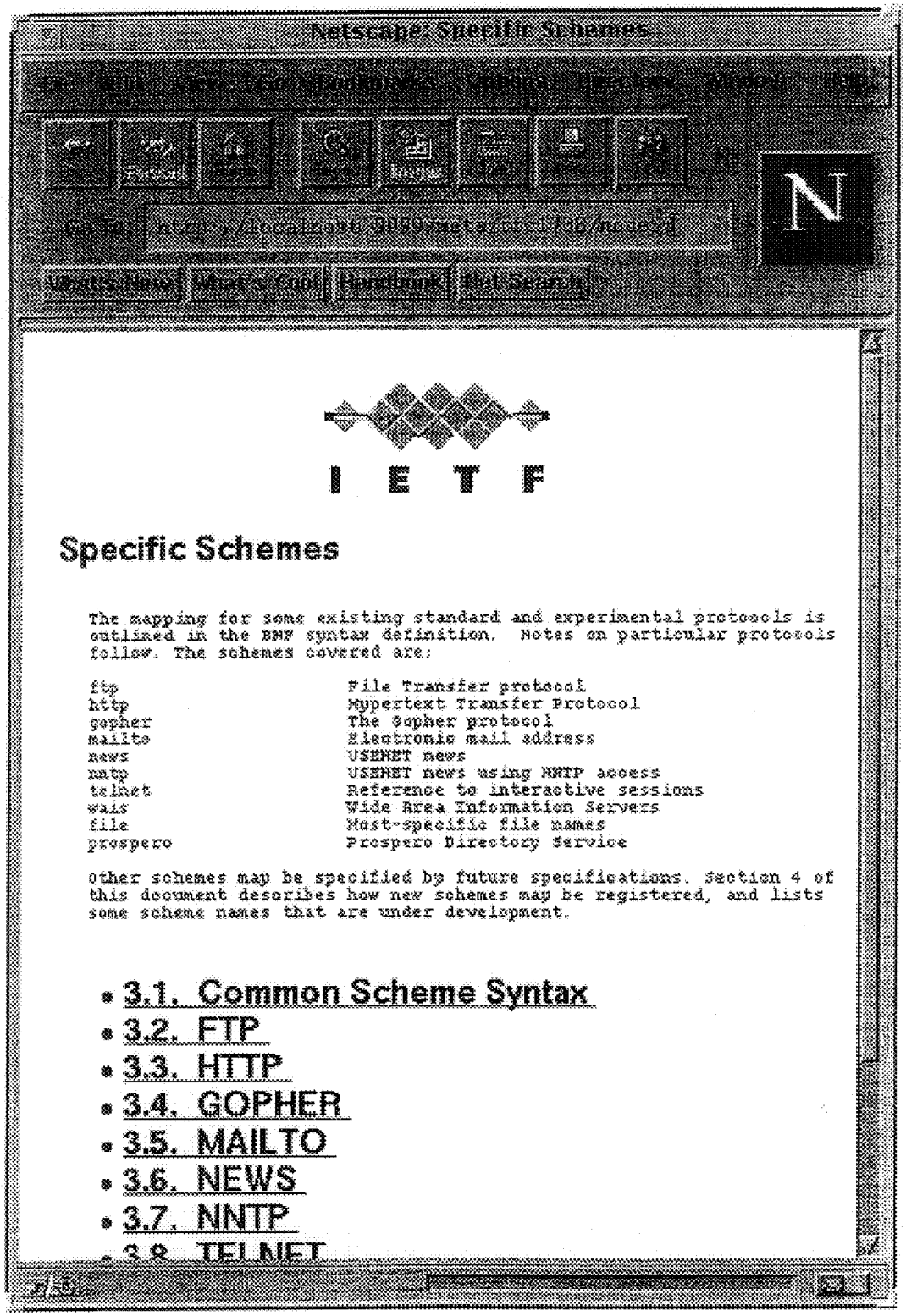

FIGS. 3a–3b demonstrate the flexibility of the presentation system, in that stored data may be displayed in different formats without affecting the data itself. As can be seen in FIG. 3a, the stored data as displayed contains both titles and body text. Each title and associated block of text below 310 has been encapsulated according to the user's specification as described more fully below. In FIG. 3b, the user has requested display of the data in a hierarchical format, only showing the block titles 320 without the attached data. Each title 320 is shown as a hyperlink, which allows the user to retrieve the associated body text as desired. A "hyperlink" allows the user to jump directly to the desired section of the overall document by selecting the highlighted text, rather than having to scan down the entire straight text version that would be necessary without the encapsulation and system of the present invention. The manner in which the stored data is displayed is controlled by a presentation specification, such as shown in FIG. 3c.

Referring now to FIG. 4, a type specification for the example news items of FIG. 2 is shown. As can be seen in FIG. 4, the empty line, separator, and title are defined as they are expected to occur in the stored data. Of course, the type specification requires some foreknowledge of the expected format of the stored data. In practice, setting up an existing database for use with the present system requires a programmer to view the form of the existing data and then write the type specification based on the form found. In example in FIG. 4 (referencing the documents in FIG. 2), the body text is defined as all data after the title and before the separator. The stored data subunit "News_Item" defined in the type specification is defined therein as a title ($Title) and its associated body text ($Item_Body), with some empty lines. The last definition in the type specification sets the overall type (DEFINE ETYPE) as defined above as "News."

FIG. 4 shows a type specification, which serves as a basis for generating the compiled type specification. FIG. 5 shows a repository specification that is automatically generated by a structure specification (defined below). When interpreted by the system, the repository specification enables accesses to the stored data at the remote server and encapsulates the data according to the type and structure specifications. The structure specification is described in more detail below. In this example, each news item consisting of a title and body text is encapsulated. As a result, for each news item, a single encapsulation unit is created containing the location and type of the stored data.

FIG. 6 shows a series of metadata entries for encapsulated news items. As can be seen in the figure, each metadata entry is associated with an encapsulation unit and has a machine name and directory location for the gross file containing the associated item of stored data. Additionally, the metadata shown in the figure contains the location within the file (e.g., "%1" "%2" in FIG. 6) of each item. The metadata preferably is also generated to include the "name" of the associated unit of stored data, so that it may be easily indexed and searched, and thus displayed in index or table-of-contents style format with a hyperlink to the actual stored data.

Figure 7:
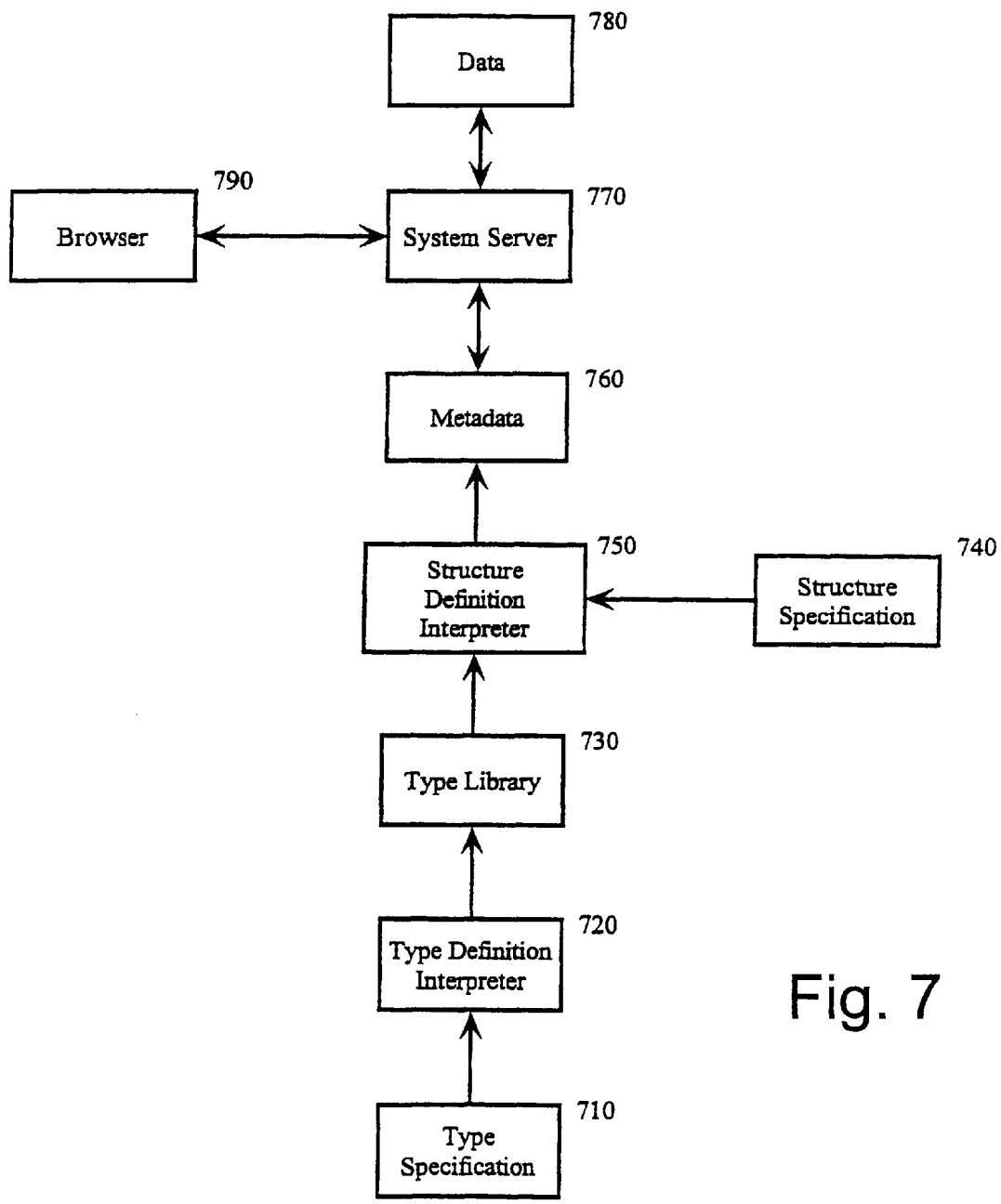
FIG. 7 is an overall logic schematic of the operation of the system of the present invention.

Referring now to FIG. 7, the overall functional schematic of the system of the present invention is shown. Initially, before any requests for the stored data may be received and processed by the system, both the type and structure specifications must be defined and the stored data must be processed to generate metadata. Thus, at block 710, the type specification is entered into the system for the particular format of the target stored data (e.g., as in FIG. 4). A type definition interpreter (block 720) generates a compiled type specification and adds it to a type library (block 730) that is maintained for all formats of stored data. Once the library is created, any data in a format previously defined in the library can later be processed without creating another type specification for that particular format. The specification may also be used for data in a slightly different format than that for which it was originally created if the end result of the display is suitable.

To determine the structure of the repository, the user must also enter a structure specification (block 740), which will describe how to organize the encapsulated units of the stored data. The structure specification may apply to a number of items having any format, as opposed to the type specification, which applies to a particular format itself. This allows specific files to be displayed according to different formatting choices, even though they may have been stored in a similar format. The structure definition interpreter (block 750) then takes the structure specification, along with the compiled type specification to create metadata (block 760) for the stored data. Of course, the system must access that data during metadata generation through the system server (block 770; see item 130 in FIG. 1) to the remote server (block 780; item 140 in FIG. 1).

In use, the user accesses a browser (block 790) and enters an HTTP request for data, which is routed to the main server 770 including the present system. The server retrieves the metadata for the request which tells the server the location of the remote files and the location within the files of the requested data. The encapsulated stored data is retrieved and processed into HTML format, according to the metadata (which was generated according to the structure specification) and the presentation specification, and then returned to the display location for display via the user's browser.

One aspect of the present invention is the relationship between repositories and the resources referenced with the repositories. As background, when a user accesses a server directory through a web browser without specifying a specific file, the server will usually default to a file named "index.html" and return that file to the browser. The present invention includes an advanced default procedure, which allows for dynamic resources to be used as defaults and for parameterized defaults based on the state and history of access of the user. As discussed above, the generation of metadata for stored resources may also include references to particular attributes of the stored resources (e.g., title, body, etc.). The system of the present invention uses these stored attributes to determine the default resource to be returned to the user's browser. For example, information regarding the user can be transmitted to the repository, which will choose which file having selected attributes to return based on the information regarding the particular user requesting the data for display.

The information on the user may be passed to the repository in the URL that is transmitted to the system server. When the system server generates the HTML page and forwards it to the user, the URLs embedded in the page are generated to include information already gathered about the user. The system gathers this information through requests sent from the user. For example, the type of data requested by the user, or the format of the data requested, is used to select which of the resources within the repository to return to the user. Of course, if no information regarding the user is available, the repository is pre-programmed with a default resource to return.

Figure 8:
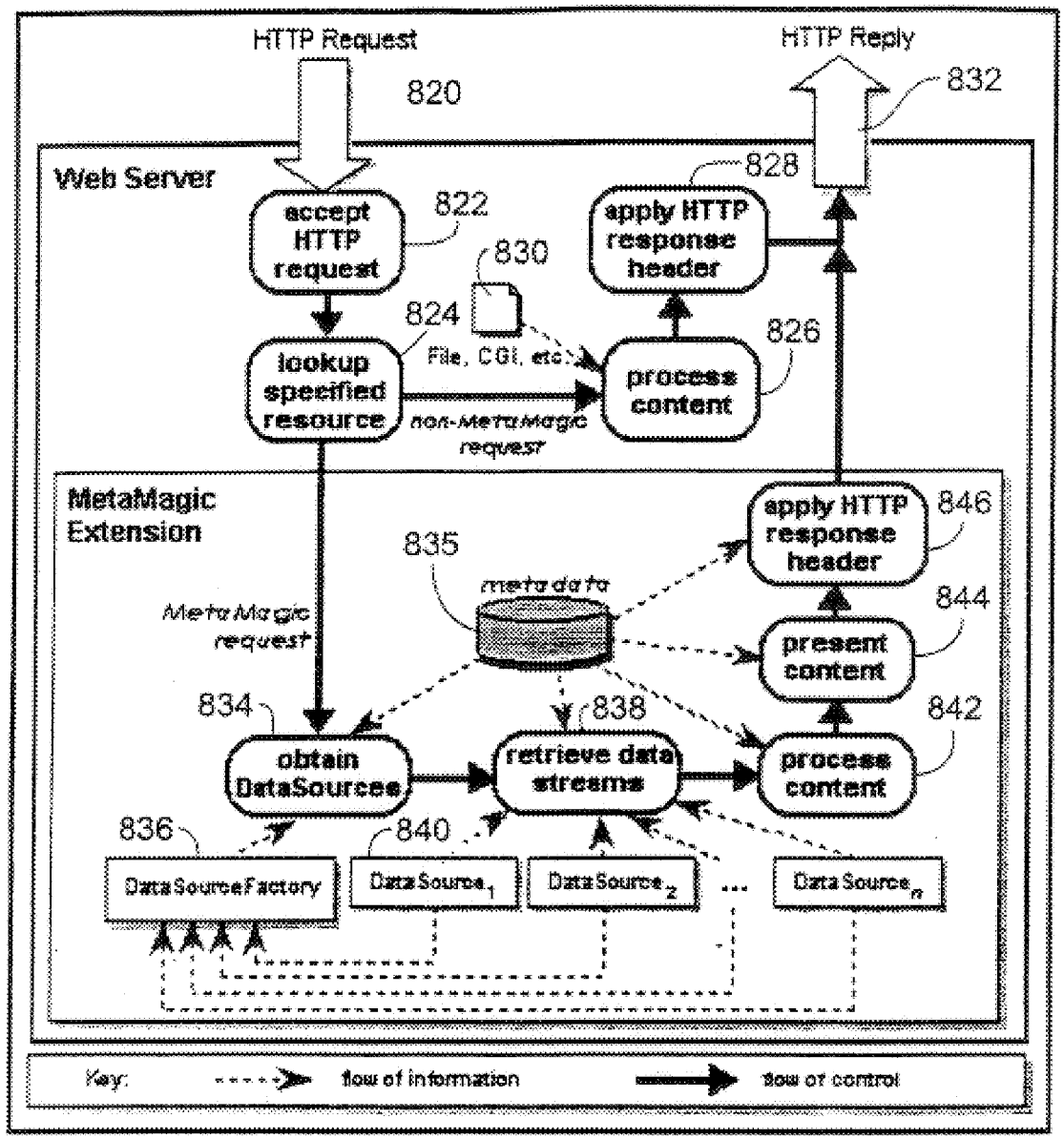
FIG. 8 is a logic schematic of a data request to the system of the present invention.

Referring now to FIG. 8, further details of the operation of the main server is shown, specifically with reference to an HTTP request. Initially, an HTTP format request is received by the main server 130 (block 820), which is accepted by the server (block 822). The system determines if the request applies to stored data for which metadata exists (block 824). If not, the request is processed (block 826) as with any standard HTTP request. That is, the file is retrieved (block 830), an HTTP response header to reroute the data back to the requestor is added (block 828), and the HTTP reply is sent (block 832).

If metadata does exist for the requested data, the system retrieves the metadata (block 834), as well as information on the data sources, such as their location (blocks 835, 836). Based on the metadata, the system retrieves the requested stored data from the remote locations (blocks 838, 840) and processes the encapsulated data by culling only the requested portions and translating them into HTML-formatted data (block 842). The HTML data is formed into an HTTP response (block 844) for reply to the user after the routing HTTP response header is added (block 846).

Figure 9:
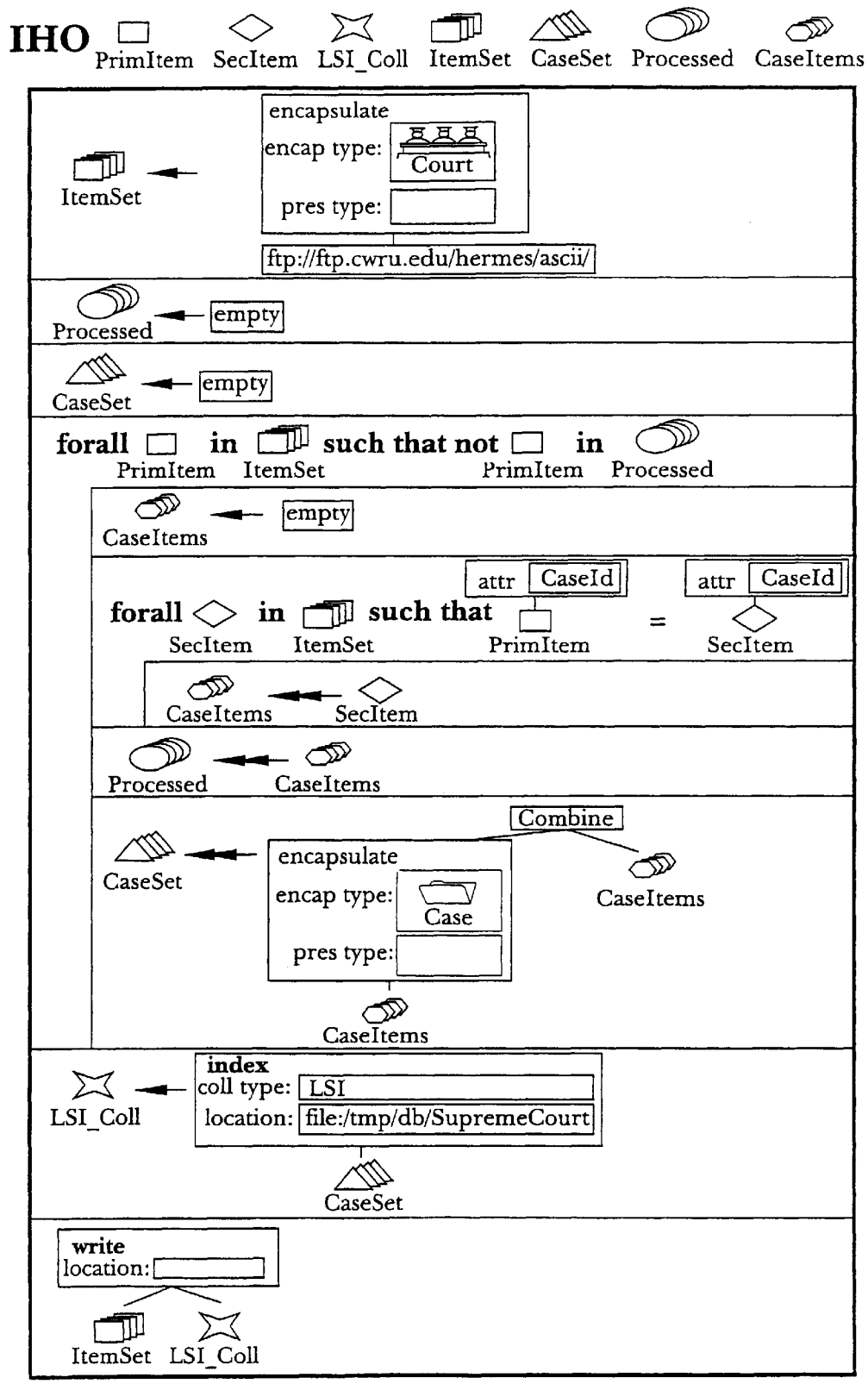
FIG. 9 is a representation of a visual structure specification of the present invention.

In addition to the components and functionality described above, the present invention also preferably includes a graphic interface and language for entering structure specifications for generating metadata. FIG. 9 shows a structure specification used to create the metadata for stored data files consisting of, for example, Supreme Court decisions.

Figure 9A:
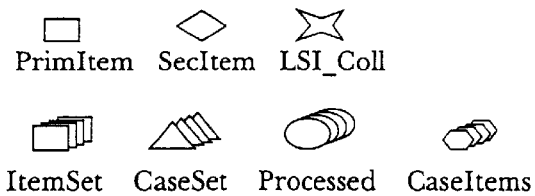
FIGS. 9a–9j are representations of various statements used in the visual structure specification of the present invention.
Figure 9B:
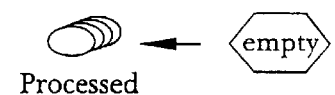

As seen in FIG. 9, the various icons used are declared first, since the definition language is a high-level language. Each variable is represented by an icon together with its name. Shape and color provide easy distinctions between different variables. Set objects (those referring to multiple items at once) are indicated by a stack of icons, as seen in FIG. 9a. The statement sequence is represented by a rectangle, which is subdivided into smaller rectangles for individual statements. Various statements may be used in the graphical definition, as follows:

The assignment statement assigns a value to a variable. Values are defined by expressions, which range from constants or other variables to complex expressions. The example shown in FIG. 9b shows the empty set being assigned to the variable "Processed." This would be used, for example, to initialize a variable to the empty set.

Figure 9C:
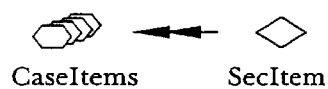
Figure 9D:
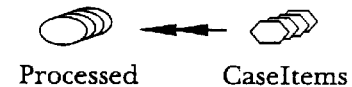

A variant of the assignment statement is the add-to-set statement illustrated in FIG. 9c, which is graphically indicated by the double arrow. The variable on the right-hand side must be a set variable, which is then added to the set on the left side as an additional element. If the right-hand-side expression is set-valued, as shown in FIG. 9d, the set is added to the set variable.

Figure 9E:
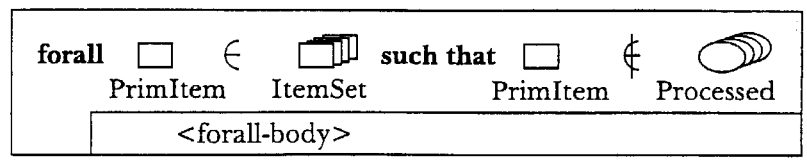

The forall statement illustrated in FIG. 9e provides selective access to set members. In this example, forall-body is executed for every element contained in the "ItemSet" which is not contained in the set accumulated in the variable "Processed." For each iteration, the element of "ItemSet" is assigned to the variable "PrimItem".

Figure 9F:
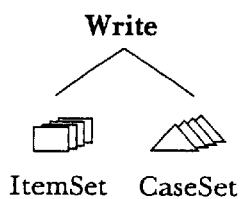

The write statement illustrated in FIG. 9f is used for storing generated metadata entities, in this example, the variables "ItemSet" and "CaseSet". Eventually, the stored metadata entities build up the information repository (block 240, FIG. 2).

Figure 9G:
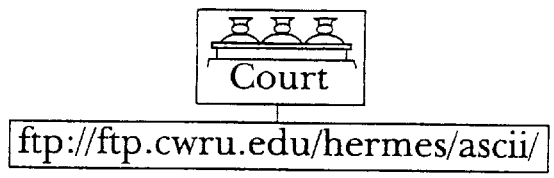

The encapsulation expression illustrated in FIG. 9g creates simple encapsulation units by analyzing the stored data. in this example, objects of the type "Court" are built from the contents of the given remote directory. The type specification "Court" and its icon are preferably defined outside of the visual programming language. In the example of FIG. 9g, the "Court" units encapsulate multiple files related to the same case.

Figure 9H:
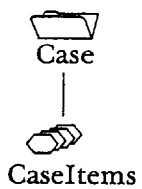

A variant of the encapsulation expression, illustrated in FIG. 9h causes metadata objects to be built from other metadata objects, providing a different formatted view of the same data.

Figure 9I:
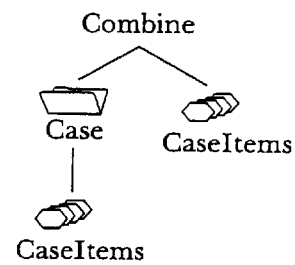

Using the combine-expression statement illustrated in FIG. 9i, containers are created combining metadata units with other metadata units, or even references to metadata units (using the recursive ability of the system). In the example shown, the repository created by the encapsulation expression is combined with encapsulation units contained in the set variable "CaseItems."

Figure 9J:
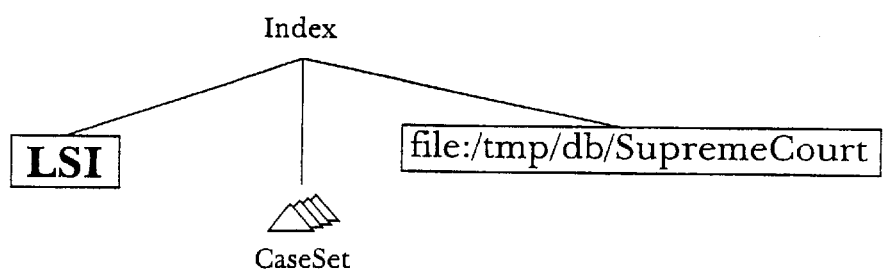

The index expression creates repositories that contain a set of references to other encapsulation units and containers and to a searchable index. In the example shown in FIG. 9j, a repository is built from the contents of the set variable "CaseSet," building a new index at the given file location. "LSI" represents what type of pre-defined indexing scheme should be used. In this preferred example, Latent Semantic Indexing is used.

The example program shown in FIG. 9 incorporates many of the statements discussed. Functionally, the program performs the following:

1. Creates encapsulation units that encapsulate individual opinions (one per file). The type specification is preferably defined such that the case numbers for the opinions are stored as attributes of the encapsulation units.

2. For each encapsulation unit created, other units related to the same case are found, grouped together into a container using the reference "Case," which refers to the type specification of the same name and excluded from further encapsulation. Preferably, the presentation specification generates internal hyperlinks to individual opinions and external hyperlinks to related information, such as justices' biographies, etc.

3. Create an indexed container using the commercial LSI technology or any other indexing technology.

Specifically referring to the program lines in FIG. 9, the first statement (at 910) serves to encapsulate individual opinions located at the input file location and assigns the generated set of encapsulation units to the variable "ItemSet." The type specification is "Court," which is precompiled before encapsulation based on that type can occur. The next two statements (at 920), initialize the "Processed" and "CaseSet" variables. "Processed" is used to accumulate repositories from "ItemSet" that should be excluded from further encapsulation, while "CaseSet" is used for grouping units that belong to the same cases.

Next, the forall-statement (at 930) iterates over the units in "ItemSet" and uses the "Processed" set as a reference to avoid assembling the same case repeatedly for every member opinion. Units that are related to the same case are determined using the "CaseID" attribute, which is set by the type specification "Court." All objects related to the same case are grouped into a repository using the type specification "Case." The combine operation (at 940) then creates further repositories that include all case-related units and contain references to units encapsulating individual opinions. When all opinion units are grouped together, an index repository (at 950) is created for units in "CaseSet" and the repository is assigned to the "LSIColl" variable.

Figure 10:
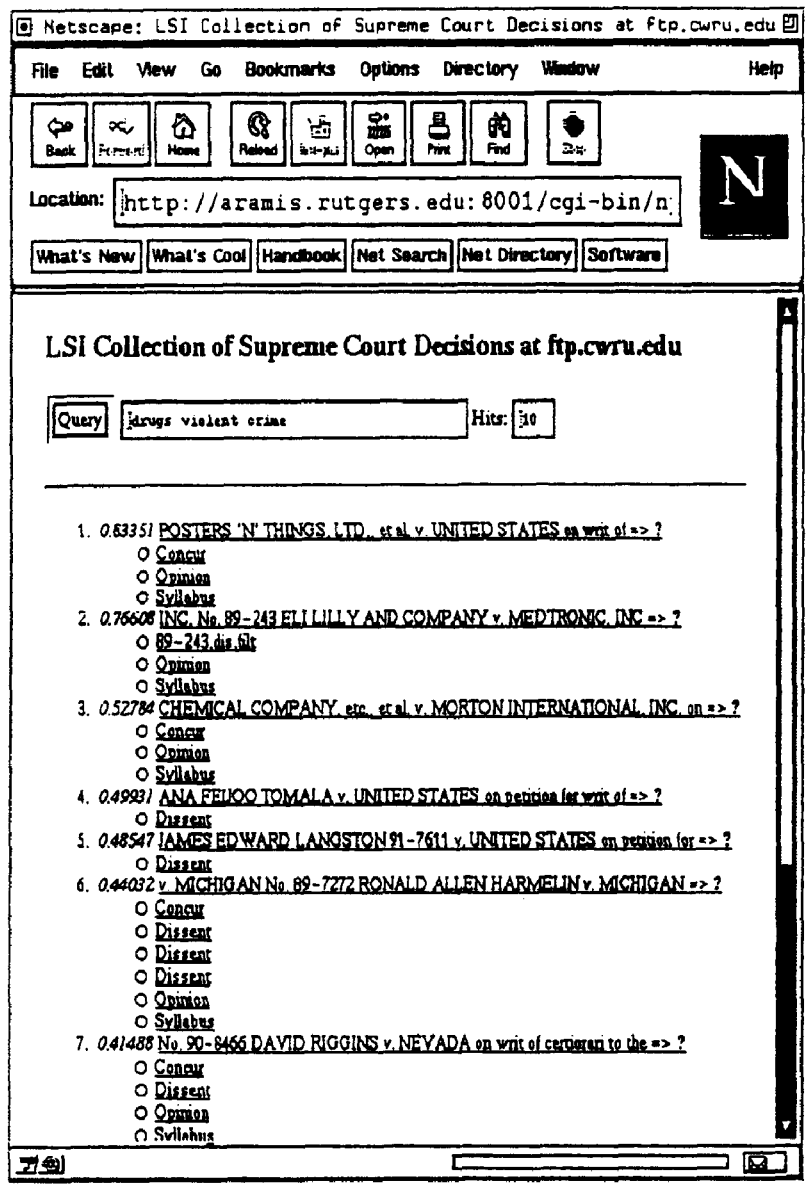
FIG. 10 is an example of browser output generated by a query of metadata.
Figure 11:
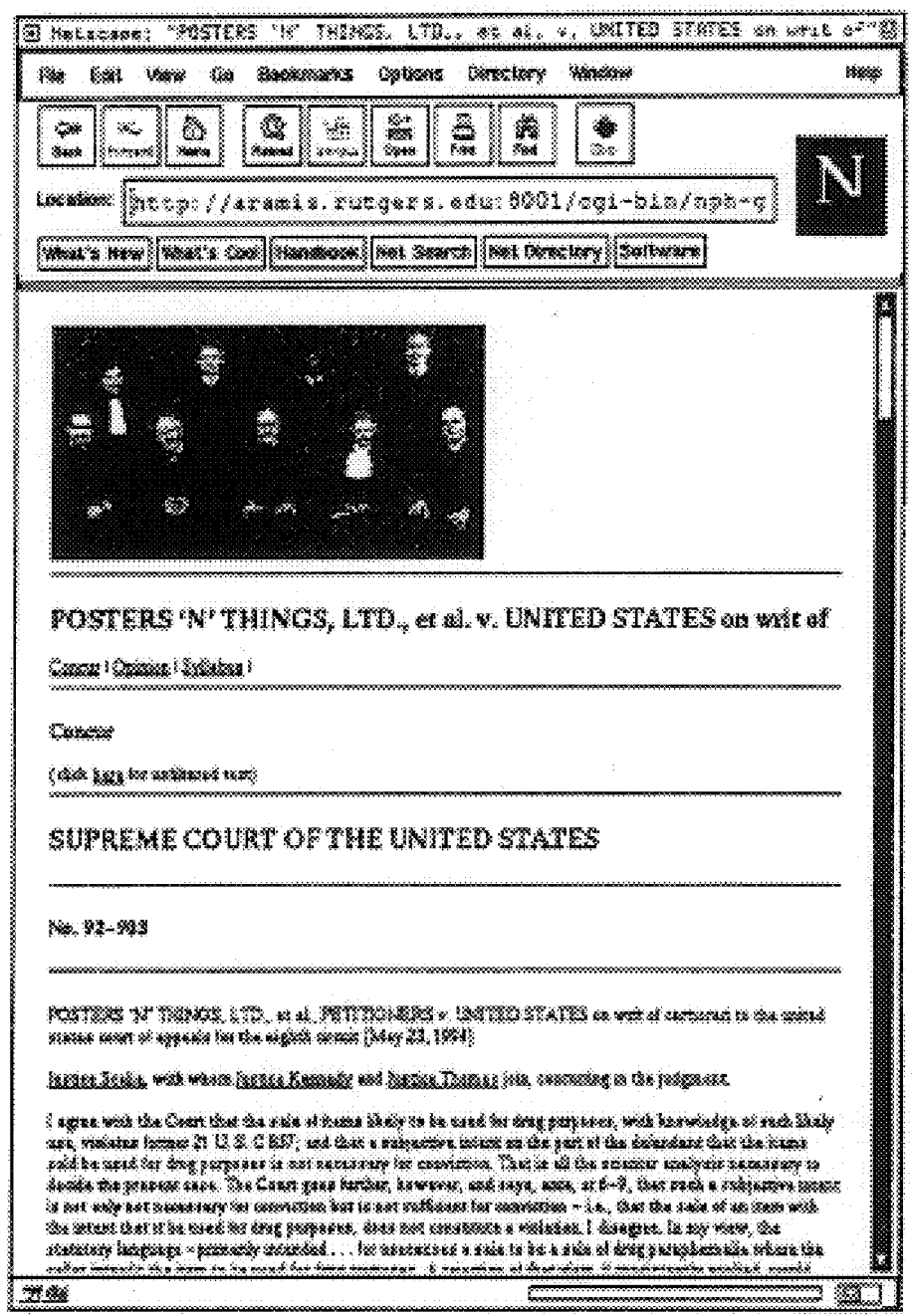
FIG. 11 is an example of browser output generated by the system of the present invention.

FIG. 10 shows a Web page that is generated by the system after searching for decisions using specific keywords using the index referenced by the repository "LSIColl." The result of the query is a list of the members of the set in "CaseSet." Since each member is a repository, we see not only a hyperlink for its content, but also hyperlinks for individual opinions. The dynamic Web page for the case unit which is referenced in the first hyperlink of FIG. 10 is shown in FIG. 11.

Another aspect of the invention is the system's ability to monitor the integrity of the data stored at various remote servers. The system uses remote agents, or programs, associated with remote servers that store data depended upon by other servers. These agents keep track of the files or metadata resources on these servers. These agents then independently monitor the metadata-indexed files and send out notifications about modifications to those files. In this way, system resources are only used by the agents when a metadata indexed file or metadata resource is modified on a remote server.

The agents are applications running on the system and remote servers that respond to requests for notification of changes to stored data files or metadata resources on that server. There are preferably three types of agents, as described below. First, a data agent keeps track of the data files on each machine containing data referenced by metadata in a repository server. Second, a repository agent, which is associated with a server having metadata, responds to requests regarding logical resources instead of actual referenced data (which is tracked by data agents). The third type of agent is the surrogate agent that is used when a particular remote server with data or resources does not have a data agent. The surrogate agent checks the files on servers without agents by polling those servers to periodically check if the stored data files have changed.

Figure 12:
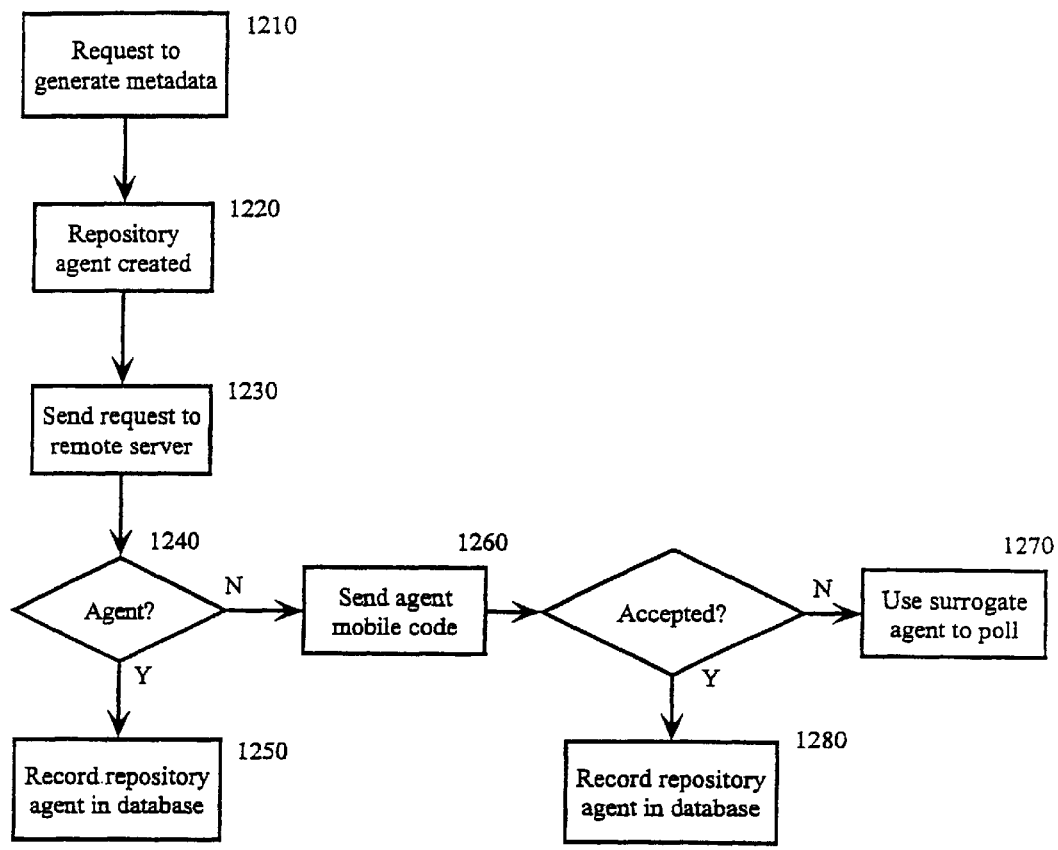
FIG. 12 is a logic flowchart of the generation of agents according to the present invention.

Referring now to FIG. 12, the agent creation process is shown schematically. Preferably, when the metadata is created, the repository agent sends a request to an agent on the server containing the files or metadata resources. If an agent is already present, it receives the request for notifications and records it for later use, described more fully below. If no agent is present, the repository agent will attempt to forward the mobile code for an agent to the remote server. If the agent mobile code is accepted, the agent begins running on that remote server with the server that created it recorded for future notification. If the mobile code is not accepted, the repository agent records in its own database that the surrogate agent must be used to poll the remote server whenever those files or resources are needed. It is not necessary to run agents at all with the system of the present invention, but the record-keeping task of which data and resources have been modified or moved will be a much more difficult task.

In FIG. 12, at block 1210, the request to generate metadata is received by a system server of the present invention and executed. As the metadata file or files are created, a repository agent is created by the system at the system server (block 1220). As each remote server is identified as having stored data or resources matching the request specifications, the system sends a request to that remote server (block 1230). If a data agent is already present on the remote server (block 1240), the repository agent is recorded in the data agent's database as a notification target for specific files or resources on the remote server (block 1250). If no data agent is present (block 1240), the repository agent attempts to forward a data agent to the remote server, by using mobile code (block 1260). Of course, if the system of the present invention does not, for example, have the appropriate privileges with the remote server, no data agent mobile code is forwarded and the surrogate agent will have to poll that server (block 1270). At block 1280, assuming a data agent is available, as each file containing stored data or metadata resources is located, the data agent on that remote server records the requesting repository agent for future notifications.

Once available, the data agents, as programs running in the background on each remote data server, then include a list of each referenced file on its associated machine and the repository agents that relate to metadata for those files. Preferably, this list may be maintained through the use of an associated database table, but any alternative storage location for the list will work similarly. Whenever a file or resource listed in the agent's database list is modified, the agent forwards a notification to each of the repository agents which sent a request when generating metadata. The stored resource may then be modified, or other actions taken (such as automatic regeneration of the metadata by the repository).

If a surrogate agent must be used because no data agent exists on the remote server and mobile code could not be forwarded, the network bandwidth and server resources that must be expended to poll the remote server are much greater than the bandwidth and resources used by a data agent. As the use of systems and servers according to the present invention grows, those remote servers that refuse to host a data agent will be more and more frequently polled by the surrogate agents, wasting system resources and encouraging the remote server administrator to allow a data agent to run on its server.

Each data agent is only related to files in its local file system and then only the file statistics stored by the operating system. For example, the data agents do not store information about the type or contents of the individual files. Instead, the data agent keeps track of such information as file length, date last modified and directory/machine location. To gather modification information, the data agent preferably does not rely on the operating system itself, as most current operating systems lack integrated notification mechanisms. Instead, the data agents periodically poll all associated file objects to see if they have been changed, created, deleted, etc., and if so, to forward notification to the repository agent associated with the requesting server.

A repository agent maintains a list of resource specifications by sending notification requests to other agents that maintain resources referenced in the specifications. It also tracks changes to local resource specifications because these specifications may be referenced by objects in other repositories with notification of those specifications requested by those other repositories. If changes were not locally tracked, they could easily propagate and affect a multitude of other resources. The "other" agents that receive requests from a repository agent may be either data agents or, in turn, other repository agents due to the recursive ability of the system. The resources may be either local or remote. When any stored data is changed, it is discovered first by the associated data agent and is then propagated through a chain of repository agent notifications. Each repository agent determines whether the change involves updating a content-based index, resource reference or other information.

For remote servers that have no data agent and will not accept mobile code, surrogate agents are preferred. Regardless of the computer's capabilities or accessibility, these agents poll via the network the remote servers assigned to them and retrieve status information on the remote physical resources. Surrogate agents are not particularly efficient, but they do add to the system's functionality to handle the absence of server-side agents. Surrogate agents may also be used to track files that are local to a client's computer/terminal.

A request from a repository agent may be formatted with any combination of notification parameters, as well as notification frequency and other client-specific requirements. For example, if it is only desirable to be notified if a file has been modified in the last 24 hour period, it would be wasteful of server resources if the agent were activated every five minutes to poll its associated stored data or resources.

Figure 13:
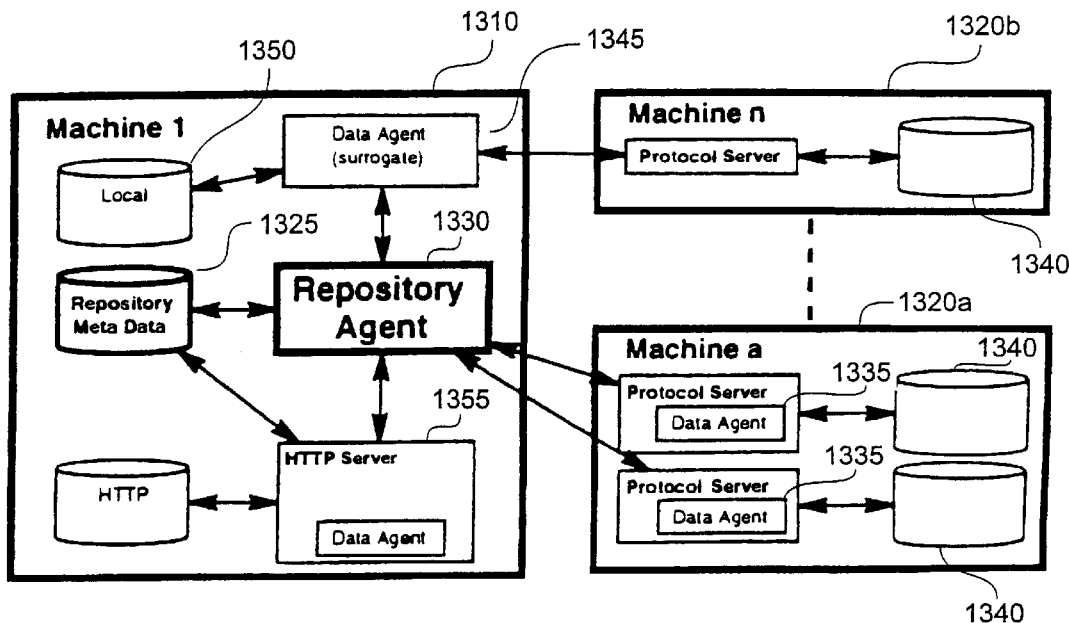
FIG. 13 is a schematic chart showing the location of agents according to the present invention.

Referring now to FIG. 13, a schematic diagram of a portion of a network containing a central server 1310 and remote servers 1320a, 1320b is shown. The central server 1310 includes a metadata repository 1325 relating to the stored data on the several servers. A repository agent 1330 monitors the metadata repository 1325 and also communicates directly with data agents 1335 on those remote servers 1320a that include them. As shown, it is possible to have more than one data agent 1335 running on a single remote machine 1320a, as more than one server 1340 may exist on that machine.

The repository agent 1330 also communicates with a surrogate agent 1345 running on the central server. The surrogate agent 1345 monitors stored data 1340 on the remote server 1320b without its own data agent, as well as the data 1350 stored locally on the central server. Accessing the metadata is accomplished preferably through an HTTP server 1355 running on the central server, which also sends requests to the repository agent 1330.

Figure 14:
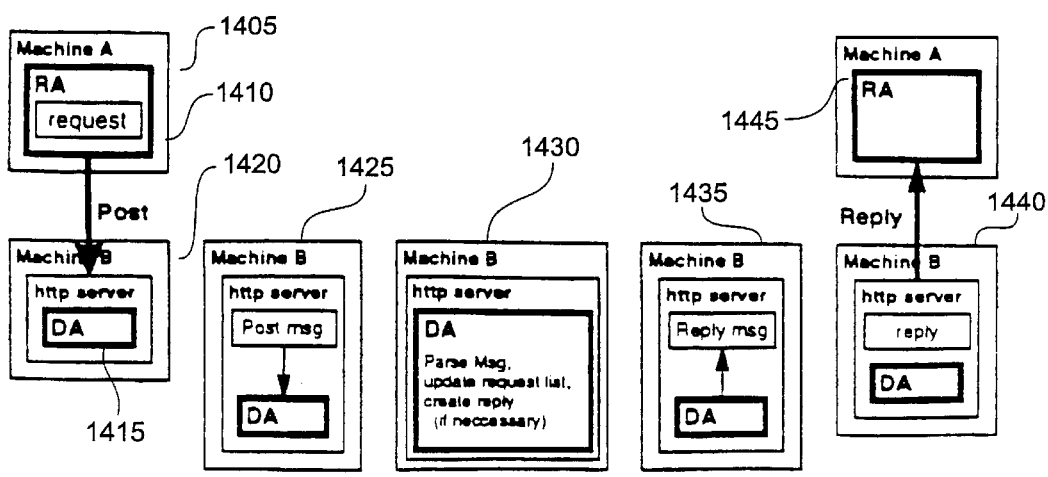
FIG. 14 is a schematic diagram showing the operation of agents according to the present invention.

The functional schematic of processing a request to a data agent is shown in FIG. 14. At block 1405, the repository agent ("RA") 1410 generates a request and forwards it to the data agent ("DA") 1415 on a remote server (block 1420). To forward the request, the repository agent preferably uses a POST message to the associated http server. At block 1425, the http server receives the POST message, analyzes the URL, and determines that the message should be processed by the data agent. The body of the message is passed to the data agent without additional processing.

At block 1430, the data agent receives the message, parses it, adds the transmitted request to its internal notification request list and decides whether a reply is needed (for example, if the reply was requested). At block 1435, the data agent, after scanning its registry for modifications to files associated with the received request, generates and forwards a reply back to the http server. The preferred implementation uses multiple threads, so the data agent passes the reply to the thread, which is responsible for sending it back to the http server. At block 1440, the http server returns a reply back to the repository agent on the central server (block 1445).

The surrogate data agent functions similar to the individual data agents, and sends similar replies to the repository agent. Preferably, the agents send messages and notifications using http socket connections. However, it is contemplated that e-mail messages may be used similarly.

In another embodiment, at the display location the system administrator (for example) can often set various security levels (i.e., levels of access) for use of the system. As noted above, depending upon the user's characteristics, the system can retrieve and display information in a form dependent upon the particular user. Using two or more security levels, this invention can thus return certain portions of the data to the user at the display location depending upon that particular user's security access level. In this way, the same source data could be used for all users at the display location, but different parts of that data are displayed at the display location so that user's with a lower level of access (less security) can be shown less information that a user with a higher security clearance. It should be appreciated that the "display location" may include multiple display terminals, and users at those terminal may have different security levels assigned to them. This invention thus allows the same source data to be available for all of those users, while the metadata or template determines, based on the user's preferences and/or security level, what any particular user sees at the display terminal.

Thus, it can be seen that the system of the present invention and its various embodiments are fully capable of achieving the above-mentioned and other objects and advantages of the present invention, although not every embodiment need meet every object and advantage.

While the embodiments shown and described are fully capable of achieving the objects and advantages of the present invention, it is to be understood that the above embodiments are shown merely for the purpose of illustration and not for the purpose of limitation, the invention being only limited by the claims, as follows:

We claim:

1. A system for interrogating stored data at a source location, and for retrieving and displaying a select portion of the data at a display location via electronic networking, said system comprising:

(a) a type specification particular to the data, and generating one or more encapsulation units comprising instructions for extracting from the stored data the select portion thereof;

(b) metadata including said encapsulation units identifying the select portion of said data for being displayed at the display location, and means for identifying how to present the select portion of said data at the display location, said metadata residing at a location suitable for communication with both of the source and the display locations; and (c) a computer for processing said metadata to access and retrieve the select portion of said data defined by said encapsulation units, and for displaying the select portion of said data at the display location.

2. A system according to claim 1, wherein said stored data includes data defined by different type specifications.

3. A system according to claim 1, and comprising a presentation specification for determining the format for displaying the select portion of said data at the display location.

4. A system according to claim 1, further comprising means for displaying said data at said display location via hypertext transfer protocol (HTTP).

5. A system according to claim 1, wherein at least one of said encapsulation units refers to one or more other encapsulation units.

6. A system according to claim 1, further comprising a library of type specifications.

7. A system according to claim 1, and comprising processing means for presenting the source data to the display system as a mark-up language file, image, executable code, video, audio, plain text, modeling language file, or a combination thereof.

8. A system according to claim 7, wherein the mark-up language is hypertext mark-up language (HTML) or extensible mark-up language (XML).

9. A system according to claim 1, wherein the metadata includes said type specification.

10. A system according to claim 1, further comprising two or more security levels for accessing data at said display location and displaying said data according to the security level of the user at the display location, wherein the security level of the user at the display location determines the data displayed at the display location.

* * * * *